United States Patent [19]

Drometer

[11] Patent Number: 4,508,393
[45] Date of Patent: Apr. 2, 1985

[54] BRAKE-FORCE CONTROL FOR AT LEAST ONE AXLE OF A VEHICLE EQUIPPED WITH AN ANTI-LOCKING SYSTEM

[75] Inventor: Klaus Drometer, Ostfildern, Fed. Rep. of Germany

[73] Assignee: Daimler-Benz Aktiengesellschaft, Stuttgart, Fed. Rep. of Germany

[21] Appl. No.: 458,049

[22] Filed: Jan. 14, 1983

[30] Foreign Application Priority Data

Jan. 15, 1982 [DE] Fed. Rep. of Germany ....... 3201047

[51] Int. Cl.³ .............................................. B60T 8/04
[52] U.S. Cl. ................................................ 303/111
[58] Field of Search ............... 303/100, 103, 106, 111; 188/181 A, 181 C

[56] References Cited

U.S. PATENT DOCUMENTS 3,972,568  8/1976  Fleischer ....................... 303/111 X
4,203,632  5/1980  Fabreges ........................... 303/111

Primary Examiner—Duane A. Reger
Attorney, Agent, or Firm—Walter W. Burns, Jr.

[57] ABSTRACT

A system employing at least one axle of a vehicle equipped with an anti-locking system for achieving a control behavior operating according to modified individual control (MIC) to prevent yawing moments on the vehicle during controlled braking on roads with very different road-holding values between the left and right side of the vehicle wherein a sensor assigned to each wheel is provided with two separate brake circuits separately controllable by brake cylinders serve, the first brake circuit of each wheel being controlled respectively by a control channel as a function of the movement behavior of the actual wheel to be controlled and a second brake circuit of each wheel is controlled by a common control channel assigned exclusively as a function of the movement behavior of the wheels and a further driving parameter of the vehicle.

20 Claims, 1 Drawing Figure

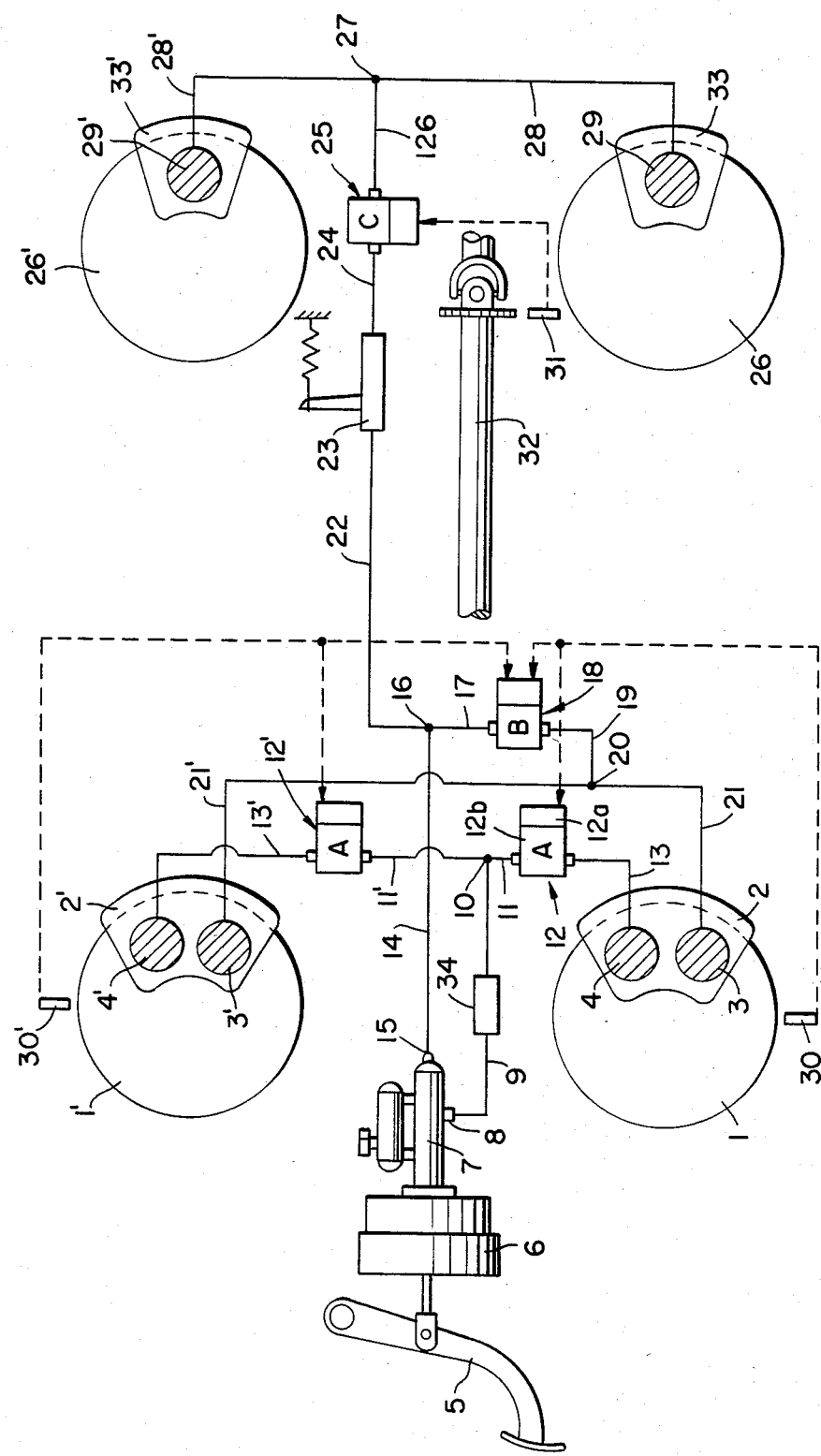

BRAKE-FORCE CONTROL FOR AT LEAST ONE AXLE OF A VEHICLE EQUIPPED WITH AN ANTI-LOCKING SYSTEM

The invention relates to a brake-force control for at least one axle of a vehicle, especially a motor vehicle, which is equipped with an anti-locking system and of which the wheel brake or brakes of the other axle or axles are controlled by at least one control channel, with at least one control channel for the brake of the wheel or the brakes of the wheels of this axle, and with a sensor for each wheel of this axle.

The purpose of an anti-locking system in vehicles is to ensure directional stability, steerability and short stopping distances, even when the service brake system is fully actuated.

An anti-locking system (ALS) consists of one or more sensors for detecting the state of movement of one or more wheels, of evaluation and control electronics and of one or more control elements, and by a control channel is meant the portion of the evaluation electronics which evaluates the signals from at least one sensor, as well as the control element controlled by the said components by means of the associated control electronics, together with the corresponding inlet and outlet valves for modulating the brake pressure in the brake line of the wheel or wheels to be controlled by the control element.

In practice, various controls have been put into effect. An anti-locking system in which each individual wheel is controlled by its own control channel (individual control=IC) could be considered as a "technically high-grade" system on a four-wheel vehicle.

The advantage of an IC system is that the physically available coefficients of friction between the tires and the road, while preserving cornering priority, can be used in the best possible way for maximum decelerations, that is to say for the shortest possible braking distances. However, the IC system has disadvantages when the road-holding conditions of the wheels of the left and right sides of the vehicle have different values. In this case, the maximum possible brake force at a particular time is applied by the anti-locking system, and this leads, under the given conditions, to a severe yawing moment on the vehicle. This yawing moment has to be absorbed by cornering forces on the wheels, resulting in the necessity for sharp steering corrections. Even on vehicles with a steering roll radius of zero or with a negative steering roll radius, these steering corrections are necessary, even though they involve correspondingly smaller application of force.

It was recognized relatively early within the framework of anti-lock development that such a full control system is not the best possible solution in relation to the enormous range of possible braking situations. In some situations, it would be better to have, for example, a control system in which, to the advantage of improved tracking, the brake forces on the "wheel with the best braking capacity" would not be fully utilized. This takes place, in an extreme fashion, in the so-called "select low control (SLC)", in which the brake pressures on the brake cylinders of the wheels of an axle are always applied in equal amounts, although the absolute amount is determined by the wheel which has the least tire/road adhesion.

Although this SLC system ensures the steerability of the vehicle even on roads with highly varying road-holding values on the left and on the right ($\mu$-split), it nevertheless needs the longest stopping distances.

On the basis of the knowledge described here, problem-solutions have emerged, especially for heavy commercial vehicles, in the course of the development of anti-locking systems, and in these a (variable) reduction in the yawing moment on one axle or both axles of a four-wheeled road vehicle is brought about as a result of the use of special control logic. Accordingly, the IC control-loop arrangement provided with this device may be considered, in terms of its effects, as lying between the IC and the SLC control-loop arrangements and is called "Modified Individual Control (MIC)".

In passenger cars of conventional design, anti-locking systems with an IC control-loop arrangement on the front axle and an SLC control-loop arrangement on the rear axle have proved appropriate in practice. However, not all road vehicles can be braked in a controlled manner under all operating conditions by means of this system.

The use of an anti-locking system with such special control logic can scarcely be justified in economic terms for the comparatively small numbers of vehicles for which it is required.

An object of the invention is therefore the provision of an improved brake-force control for at least one axle of a vehicle equipped with an anti-locking system.

Another object of the invention is to provide an anti-locking system by means of anti-locking system and brake elements already produced in sufficient numbers, and consequently to achieve, also without the development and production of special control logic (control electronics), an effective reduction in the yawing moment and, as a result, economical brake-force control of the MIC type.

It is another object of the invention to produce a brake-force control for an axle of a vehicle, especially a motor vehicle, which is equipped with an anti-locking system and of which the wheel brakes of the other axle or axles are controlled by at least one control channel, there being assigned to each wheel of this axle a sensor and two separate brake circuits with separately controllable brake cylinders, and the first brake circuit of each wheel being controlled respectively by a control channel as a function of the movement behaviour of the actual wheel to be controlled, characterized in that the second brake circuit of each wheel of this axle is controlled by a common control channel, assigned exclusively to these wheels, as a function of the movement behaviour of these wheels and/or a further driving parameter of the vehicle.

It is another object of the invention to provide a brake-force control for a vehicle equipped with an anti-locking system having a first axle with at least two wheels, first and second brake circuits for each of said wheels of said first axle for controlling separate brake cylinders therefor, a first control channel for controlling said first brake circuit of each of said wheels as a function of the movement behaviour of said each wheel independent of movement behaviour of other wheels and a second control channel for controlling in common said second brake circuit for each of said wheels of said first axle as a function of the movement behaviour of the said wheels of said first axle.

It is another object of the invention to provide a brake-force control wherein means is provided for controlling at least one of first and second control channels in accordance with at least one further driving parameter.

It is another object of the invention to provide a brake-force control controlled by the angle of steering lock.

It is another object of the invention to provide a brake-force control controlled by further driving parameters comprising at least one of yawing speed and yawing acceleration.

It is another object of the invention to provide a brake-force control with means for controlling the maximum brake pressure of a first brake circuit as a function of one of the load state of the vehicle and of an axle.

It is a further object of the invention to provide a brake-force control comprising at least a means for controlling the maximum brake pressure of at least one of a first and second brake circuit as a function of a load dependent control variable.

It is a further object of the invention to provide a brake-force control wherein at least one of the maximum brake forces and the diameters of the brake cylinders, respectively, of a first brake circuit are of equal size and are equal to or different from the maximum brake forces of the corresponding forces and diameters of the brake cylinders of a second brake circuit, the latter being of equal size.

These and other objects, features, and advantages of the present invention will become more apparent from the following description when taken in connection with the accompanying single FIGURE drawing which shows, for the purposes of illustration only, one embodiment in accordance with the present invention, and wherein like elements are designated with like reference numerals.

The FIGURE shows a configuration for a vehicle with two axles and with two wheels for each axle, the front axle brakes of which are controlled by two circuits and the rear axle brakes by a single circuit.

By brake circuit is meant the mechanical/hydraulic or mechanical/pneumatic part of the brake system from the brake pedal via a control element up to the brake cylinder of a wheel.

The wheel brakes are shown as disc brakes with the brake discs 1 and 1' and the brake calipers 2 and 2'. For each side of the vehicle, the wheel-brake cylinder pistons 3, 4 and 3', 4' repsectively are accommodated in the brake caliper 2. The wheel-brake cylinder pistons 4 and 4' respectively are subjected to pressure because the driver depresses the brake pedal 5, the foot force being intensified by a servo-brake 6 which may be present, and acting on the main-brake tandem cylinder 7; at the same time, the hydraulic pressure arising there is conveyed via the connection 8 into the line 9 up to the branching point 10, via pressure control element 34 to be explained later, and from there via the lines 11 and 11' to the control elements of the control channels 12 and 12' respectively. The elements of the control channels 12 and 12' are shown as being located in a two-part box for each of the latter, and the evaluation electronics and the control electronics are located in one part, 12a for example, and the control element is located in the other part, 12b for example. The brake pressure controlled appropriately by the control elements passes via the lines 13 and 13' into the associated wheel-brake cylinders 4 and 4' respectively, and there presses the brake linings (not shown) against the brake discs 1 and 1' respectively. The above-described brake circuit (for each wheel of the front axle) is designated as circuit A in the further description. The second brake circuit B taking effect on the front-wheel brake consists of the line 14 which is connected to the connection 15 of the tandem main-brake cylinder 7 and which leads via the branching point 16 and via the line 17 to a third control channel 18 required for the front-axle control on the principle according to the invention. Since the brake pressures in the front-wheel brake cylinders 3 and 3' respectively are controlled on the SLC principle, after the control element of the control channel 18 a common line 19 leads to the branching point 20, and from there via the lines 21 and 21' respectively to the previously mentioned wheel-brake cylinders 3 and 3' respectively, where friction elements (likewise not shown) are pressed against the brake discs 1 and 1' respectively.

Furthermore, a line 22 leads from the branching point 16, if appropriate via a valve also present of an automatically load-dependent brake-force control device (ALB) 23 and via a line 24 to the control channel 25 which, in the case shown here, controls the brake pressures for the wheel brakes 26 and 26' respectively of the rear axle according to the SLC principle. At the same time, the brake pressure generated by the brake unit 5, 6 and 7 passes via the connection 15 and the lines 14, 22, 24 and 126 to the branching point 27, and from there further via the lines 28 and 28' to the wheel-brake cylinders 29 and 29' respectively of the rear-wheel brakes. The brake circuit described here is called brake circuit C in the following description.

A further feature of the brake-force control described here is the fact that the wheel-brake cylinders 3 and 3' have the same diameters, but can have diameters different from those of the wheel-brake cylinders 4 and 4', the latter having, in turn, the same diameters relative to one another.

The use of three sensors is envisaged in the system described here, namely the sensors 30 and 30' respectively for the wheels of the front axle, and the sensor 31 for the rear axle, which sensor, for example, picks up its information at the cardan shaft 32.

Accordingly, four control channels are required for representing this anti-locking system, but these process the signals from only three sensors.

During braking on roads with uniform coefficients of adhesion on the left and right wheel tracks, the system described here behaves, in practice, in exactly the same way as IC or MIC brake systems or, with certain restrictions, also as an SLC brake system. During braking on roads with very different coefficients of adhesion on the wheels of the left and right sides of the vehicle, however, the following takes place:

On the assumption that the driver increases his foot force on the pedal 5 continuously and the brake pressure likewise increases continuously in the brake circuits A, B and C, the critical coefficient of friction between the tire and the road will be exceeded first on one side of the vehicle as a function of the lower adhesion, and control will consequently begin.

On the assumption that the driver further increases the brake pressure, from now on the brake pressure in the brake circuit B will remain constant on average as a result of appropriate control actuation in the control channel 18.

On the assumption that the wheel tending to lock first is that which is connected to the brake disc 1, the brake pressure in the wheel cylinder 4 is also kept constant as a result of appropriate control actuation in the control channel 12. As described previously, the increasing brake pressure can, from now on, only act on the brake cylinder 4' (in the brake circuit A), so that, from the moment when on one vehicle side of the front axle the wheel transfers to controlled brake operation, on the other side of the vehicle only the piston of the brake cylinder 4' is available for building up additional brake force in response to appropriately stronger actuation of the brake pedal, since, under the conditions described, no increase in the brake pressure is possible in the brake cylinder 3'.

This measure guarantees that, in comparison with a brake system with control on the IC principle, in an extreme case the maximum brake force installed per wheel can no longer occur as the brake-force difference at the wheels of this axle, but only the portion which the brake-piston surface of the corresponding piston (for example, 4') contributes to the sum of the brake-piston surfaces of the two pistons 3' and 4'.

Up to differences in adhesion on the left and on the right which can still be controlled by the driver, the brake system according to the invention behaves in the same way as an IC brake system for very short braking distances. However, when the differences in adhesion increase to such an extent that an IC brake system would result in braking maneuvers which can no longer be controlled, the brake-force difference between the wheels of the front axle is limited so that no uncontrollable braking maneuvers occur even when there are extremely unfavorable differences in adhesion between the left and right.

Of course, it is also possible to provide on the rear axle of this vehicle wheel brakes which can likewise be controlled by two circuits, in which case three control channels also become necessary on this axle.

To obtain the desired effect of a reduction in the yawing moment also for the no-load state, installed in the line 9 of the brake circuit A is a pressure control element 34 which varies the brake pressure as a function of the load state of the vehicle. As a result, for example when the vehicle is empty, a correspondingly lower steady pressure is effective in the brake circuit A than is present in the brake circuit B, as a result of which the maximum possible brake-force difference on the front axle of the empty vehicle is less. Consequently, even in this case, it is possible to ensure braking of the vehicle under μ-split conditions which can still be controlled effectively.

However, the brake pressure in the pressure control element 34 can also be controlled independently of the difference in brake pressures in the wheel-brake cylinders 4 and 4', although this is not shown in the drawing. The result of this would be that a specific brake-pressure difference could not be exceeded.

Finally, it is also possible to form a control variable for the pressure control element 34 from the combination of the load state, the brake-pressure difference and other driving parameters, such as, for example, the steering lock, yawing speed, yawing acceleration, and the like.

It will be appreciated that the circuitry of the pressure control element 34 will be formed by those skilled in the art from structures known in the prior art and, per se, forms no part of the present invention. Thus, the device may comprise one or more sensors, the sensors sensing load state of the vehicle in empty and loaded condition, or load state of a particular axle under empty and loaded conditions, angle of steering lock, yaw speed, yaw acceleration and the like. The signal received from such sensors may then be used to modify the signal received on line 9 to generate an output signal to branch point 10 which is representative of the signal received on line 9 as modified by the sensed signal.

The invention can also be applied to three-wheeled vehicles, for example, on a wheel with a double-circuit brake on the front axle. In this case, for example, the wheel behaviour of one rear wheel or both rear wheels takes the place of the wheel behaviour of the other wheel of the same axle.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. A brake-force control for a vehicle equipped with an anti-locking system having at least a first axle with at least two wheels, first and second brake circuit means for each of said wheels of said first axle for controlling separate brake cylinders therefor, a first control channel means for controlling said first brake circuit means of each of said wheels as a function of the movement behaviour of said each wheel independent of movement of other wheels, further comprising:
   a second control channel means for controlling in common said second brake circuit of each of said wheels of said first axle as a function of the movement behaviour of the said wheels of said first axle.

2. A brake-force control in accordance with claim 1, further comprising:
   means for controlling at least one of said first and second control channel means in accordance with at least one further driving parameter.

3. A brake-force control according to claim 2, characterized in that a further driving parameter comprises at least the angle of steering lock.

4. A brake-force control according to claim 2, characterized in that further driving parameters comprise at least one of the yawing speed and yawing acceleration.

5. A brake-force control in accordance with claim 1, further comprising:
   means for controlling the maximum brake pressure of the first brake circuit means as a function of one of the load state of the vehicle and of an axle.

6. A brake-force control according to claim 5, further comprising
   means for controlling the maximum brake pressure of at least one of the first and second brake circuit means as a function of a load-dependent control variable.

7. A brake-force control according to claim 1, wherein at least one of the maximum brake forces and the diameters of the brake cylinders, respectively, of the first brake circuit means are of equal size, and
   at least one of the maximum brake forces and the diameters of the brake cylinders of the second brake circuit means are of equal size, and
   the said one of maximum brake forces and diameters of the brake cylinders of the first brake circuit means are equal to or different from the at least one of maximum brake forces and diameters of the brake cylinders of the second brake circuit means, respectively.

8. A brake-force control in accordance with claim 1, further comprising
at least a second axle having at least two wheels,
a sensor means for sensing movement behaviour of said wheels of said second axle,
further brake circuit means for each of said wheels of said second axle for controlling brake cylinders therefor,
means for controlling said further brake circuit means in response to said sensor.

9. A brake-force control in accordance with claim 8, further comprising
means actuating said means for controlling said further brake circuit means in response to at least a signal which is load dependent.

10. A brake-force control in accordance with claim 8, further comprising
means for controlling at least one of said second control channel means and said further brake circuit means in response to pressure from a main brake cylinder.

11. A brake control apparatus for a vehicle, the vehicle having a first pair of wheels and a second pair of wheels, comprising
first means for applying a force to brake pistons of said first and second pairs of wheels,
second means for modifying the action of the first means in accordance with at least a vehicle parameter,
third means independent of said first means for applying a force to brake pistons of said first pair of wheels,
fourth means controlling the application of the force by said third means in response to the magnitude of motion of a first wheel of said first pair of wheels when the second of said first pair of wheels locks for performing one of reducing and preventing yaw of said vehicle.

12. A brake control apparatus in accordance with claim 11, further comprising
pedal means for actuating said first and third means.

13. A brake control apparatus in accordance with claim 11 wherein the vehicle comprises first and second axles each equipped respectively with one of said first and said pairs of wheels.

14. A brake control apparatus in accordance with claim 11, wherein said second means comprises
means for sensing the magnitude of movement of the wheels of said first pair of wheels, and
means responsive to said sensing means for modifying the action of the first means.

15. A brake control apparatus in accordance with claim 11, wherein said fourth means comprises
means for sensing the magnitude of movement of the wheels of said first pair of wheels, and
means responsive to said sensing means controlling the application of the force by said third means in response to the magnitude of motion of a first wheel of said first pair of wheels when the second of said first pair of wheels locks for performing one of reducing and preventing yaw of said vehicle.

16. A brake control apparatus in accordance with claim 11 wherein said third means comprises
means responsive to a vehicle parameter to modify application of the force of the third means for reduction of yaw of said vehicle.

17. A brake control apparatus in accordance with claim 16 further comprising
means actuated by a pedal for controlling the means responsive to a vehicle parameter.

18. A brake control apparatus according to claim 16 wherein the vehicle parameter employed to modify application of force of the third means comprises
at least one of and a combination of load state of the vehicle, brake-pressure difference angle of steering lock, yawing speed, yawing acceleration.

19. A brake control apparatus according to claim 11 wherein said second means comprises
means for controlling the modification of the force of said first means in accordance with the load of the vehicle.

20. A brake control apparatus according to claim 13 wherein said vehicle has a engine and said second means comprises
means responsive to speed of rotation of one of said axles for modifying the brake force applied to the brake pistons of the wheels of the said one axle.

* * * * *